(12) United States Patent
Markley et al.

(10) Patent No.: US 7,513,843 B2
(45) Date of Patent: Apr. 7, 2009

(54) MECHANICAL CHAIN TENSIONER WITH RATCHETING DEVICE

(75) Inventors: George L. Markley, Montour Falls, NY (US); James Capp, Endwell, NY (US)

(73) Assignee: BorgWarner Inc., Auburn Hills, MI (US)

( * ) Notice: Subject to any disclaimer, the term of this patent is extended or adjusted under 35 U.S.C. 154(b) by 719 days.

(21) Appl. No.: 11/108,449

(22) Filed: Apr. 18, 2005

(65) Prior Publication Data

US 2006/0234819 A1 Oct. 19, 2006

(51) Int. Cl.
  F16H 7/08 (2006.01)
  F16H 7/18 (2006.01)
(52) U.S. Cl. ............................... 474/111; 474/140
(58) Field of Classification Search ............... 474/109, 474/111, 140
See application file for complete search history.

(56) References Cited

U.S. PATENT DOCUMENTS

| | | | |
|---|---|---|---|
| 3,426,606 A | 2/1969 | Hopkins | |
| 3,490,302 A | 1/1970 | Turner et al. | |
| 3,830,114 A * | 8/1974 | Daines | 474/111 |
| 4,395,251 A | 7/1983 | King et al. | 474/111 |
| 4,921,472 A | 5/1990 | Young | 474/111 |
| 5,152,552 A | 10/1992 | Ikegaya | 280/806 |
| 5,797,818 A | 8/1998 | Young | 474/111 |
| 5,967,921 A | 10/1999 | Simpson et al. | |
| 6,110,063 A | 8/2000 | Okabe et al. | |
| 6,120,402 A | 9/2000 | Preston et al. | 474/109 |
| 6,193,622 B1 | 2/2001 | Cressman et al. | |
| 6,238,311 B1 | 5/2001 | Cutting | 474/111 |
| 6,244,981 B1 | 6/2001 | Simpson | 474/110 |
| 6,447,416 B1 | 9/2002 | Jacques et al. | 474/111 |
| 6,478,703 B2 | 11/2002 | Suzuki | 474/101 |
| 6,547,684 B2 | 4/2003 | Kurohata | 474/111 |
| 6,612,951 B2 | 9/2003 | Kurohata | 474/109 |
| 6,623,391 B2 | 9/2003 | Young et al. | 474/111 |
| 7,338,399 B2 * | 3/2008 | Garbagnati | 474/111 |

FOREIGN PATENT DOCUMENTS

| | | |
|---|---|---|
| DE | 2550639 | 5/1977 |
| EP | 0581219 A1 | 2/1994 |
| EP | 0867600 A2 | 9/1998 |
| EP | 1096174 A1 | 5/2001 |
| FR | 1358841 A | 4/1964 |

(Continued)

*Primary Examiner*—Robert A Siconolfi
*Assistant Examiner*—Robert T Reese
(74) *Attorney, Agent, or Firm*—Brown & Michaels, PC (57) ABSTRACT

A blade tensioner comprising a blade shoe, a sliding surface with a first and a second side, a ratchet rod attached to the distal end of the blade shoe having a length of teeth, and a spring clip for receiving the ratchet rod and being slidable along the second side of the sliding surface. When the slack on the chain increases, a distal end of the blade shoe pivots and slides on the first side of the sliding surface, and the spring clip slides on the second side of the sliding surface a distance limited by the engagement of the tab of the spring clip with the corresponding indentation on the second side of the sliding surface and the edge of the spring clip engages the teeth of the ratchet rod.

18 Claims, 14 Drawing Sheets

FOREIGN PATENT DOCUMENTS

| | | |
|---|---|---|
| JP | 62188812 | 8/1987 |
| JP | 63062946 | 3/1988 |
| JP | 08226503 | 9/1996 |
| JP | 10002386 | 1/1998 |
| JP | 2000-136861 | 5/2000 |
| JP | 2001208151 | 8/2001 |
| JP | 2004044749 | 2/2004 |

* cited by examiner

PRIOR ART

PRIOR ART

Fig. 12

PRIOR ART

Fig. 13

MECHANICAL CHAIN TENSIONER WITH RATCHETING DEVICE

BACKGROUND OF THE INVENTION

1. Field of the Invention

The invention pertains to the field of tensioners. More particularly, the invention pertains to a tensioner with a ratcheting device.

2. Description of the Related Art

Blade tensioners are commonly used to control a chain or belt where load fluctuations are not so severe as to over flex the spring or springs. A ratchet with backlash is added to tensioners to limit the effective backward or untensioned travel of a tensioning device.

Figure 12:
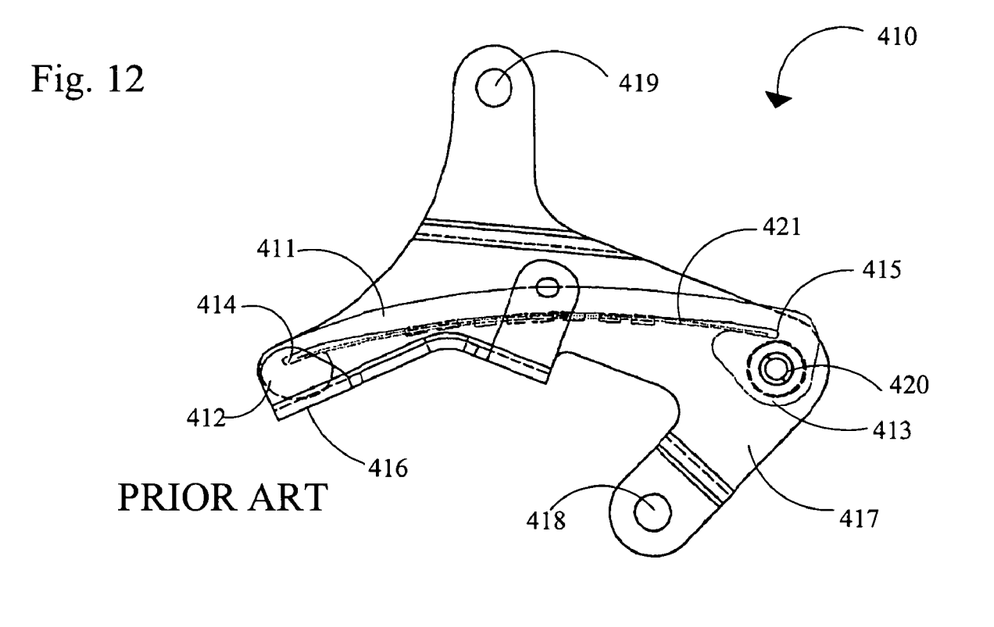
FIG. 12 shows another prior art blade tensioner and bracket.

Prior art FIG. 12 shows an example of a blade tensioner. The conventional blade tensioner 410 includes a blade shoe 411 made of resin having a curved chain sliding face and numerous blade springs 421, preferably made of metallic material. The blade springs 421 are arranged in layers on the opposite side of the blade shoe 411 from the chain sliding face, and provide spring force to the blade shoe 411. The ends of each spring-shaped blade spring 421 are inserted in the indented portions 414 and 415, which are formed in the distal portion 412 and proximal portion 413 of the blade shoe 411, respectively.

A bracket 417 is provided for mounting the blade tensioner 410 in an engine. Holes 418 and 419 are formed in the bracket 417, and mounting bolts are inserted into these holes 418 and 419. A sliding face 416 contacts the distal portion of the blade shoe 411 and permits sliding. The slide face 416 is formed on the distal portion of the bracket 417. A pin 420 supports the proximal portion 413 of the blade shoe 411 so that it may move in either direction. The pin 420 is secured on the bracket 417.

Figure 9:
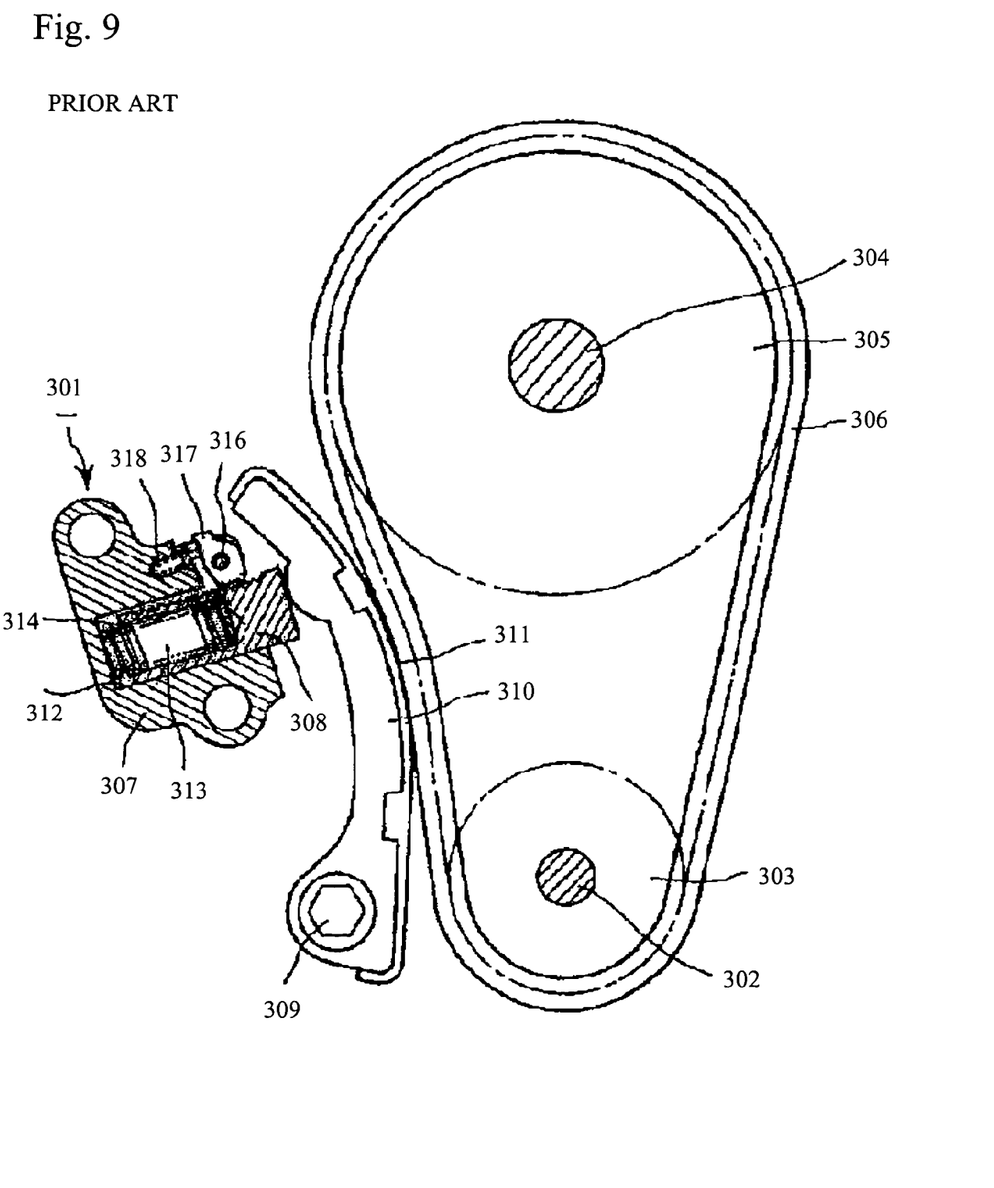
FIG. 9 shows a prior art ratcheting tensioner and chain.

One example of a tensioner that uses a ratchet device is shown in prior art FIG. 9. The ratchet tensioner 301 comprises a tensioner housing 307 having a hole 312 for receiving a plunger 308 and a ratchet pawl 317 pivoted by a shaft 316 to the tensioner housing 307 and biased by a ratchet spring 318. The plunger 308 has teeth on one outer side that engage the ratchet pawl 317. The plunger 308 is biased out of the hole 312 to contact the tension lever 310 by fluid in the hollow section 313 and by the plunger spring 314. The tensioner lever 310 pivots on support shaft 309 and has a shoe surface 311 that contacts and applies tension to the slack side of the timing chain 306 wrapped around the camshaft 304 and its sprocket 305 and the crankshaft 302 and its sprocket 303. The plunger's 308 movement in and out of the hole 312 is limited by its teeth and the ratchet pawl 317 that engage them.

Figure 10:
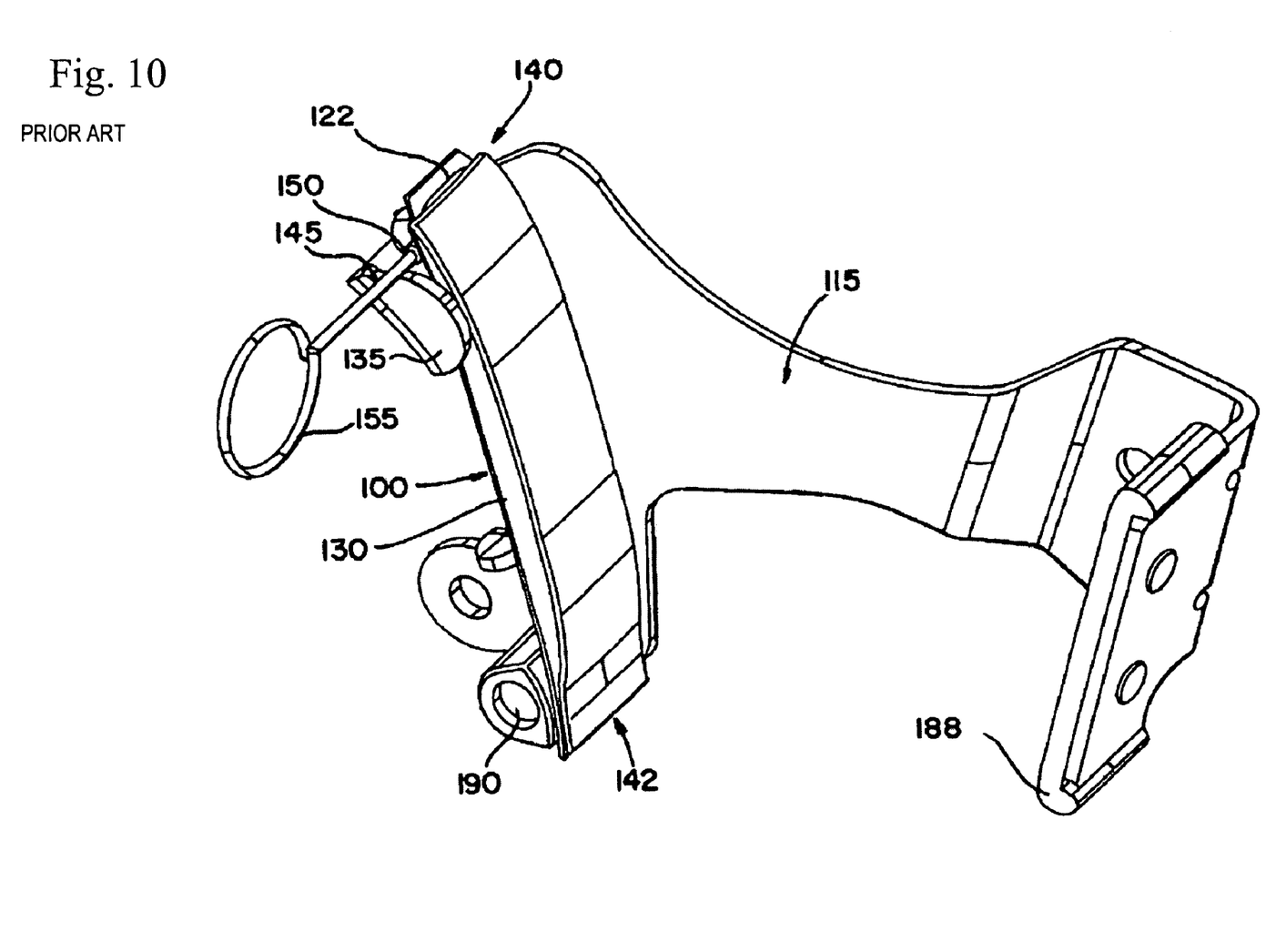
FIG. 10 shows a prior art blade tensioner and bracket.

Prior art FIG. 10 shows a prior art blade tensioner with a bracket of U.S. Pat. No. 6,238,311, which is hereby incorporated by reference. A bracket 115 has a blade tensioner 100 attached on one side and on an opposite side from the blade tensioner a passive snubber 188 is attached to guide the chain (not shown). The blade tensioner 100 is comprised of a blade shoe 130 with a first end 142 and a second end 140. The first end 142 is attached to the bracket 115 by a pivot pin 190. A blade spring end is placed within the first end 142 and the second end 140 of the blade shoe 130 and pushes against the length of the blade shoe, causing it to bow slightly towards the chain. The second end 122 of the blade spring is secured to the blade shoe 130 by hollow roll pin 150. The blade spring causes the shoe to bow slightly. As the shoe heats up, the shoe bows even more until the chain prevents further bowing. Part of the bracket 115, adjacent to the second end of the shoe 140 is formed into a tab 135. The tab 135 is spaced outward from the bracket face and has a notch 145 aligned with the roll pin 150. The first end 142 of the blade shoe 130 pivots on pin 190. The blade shoe is kept on pin 190 by tab 135. When the retaining pin 155 is placed in the roll pin 150, the blade tensioner is held in a retracted position for shipping.

Figure 11:
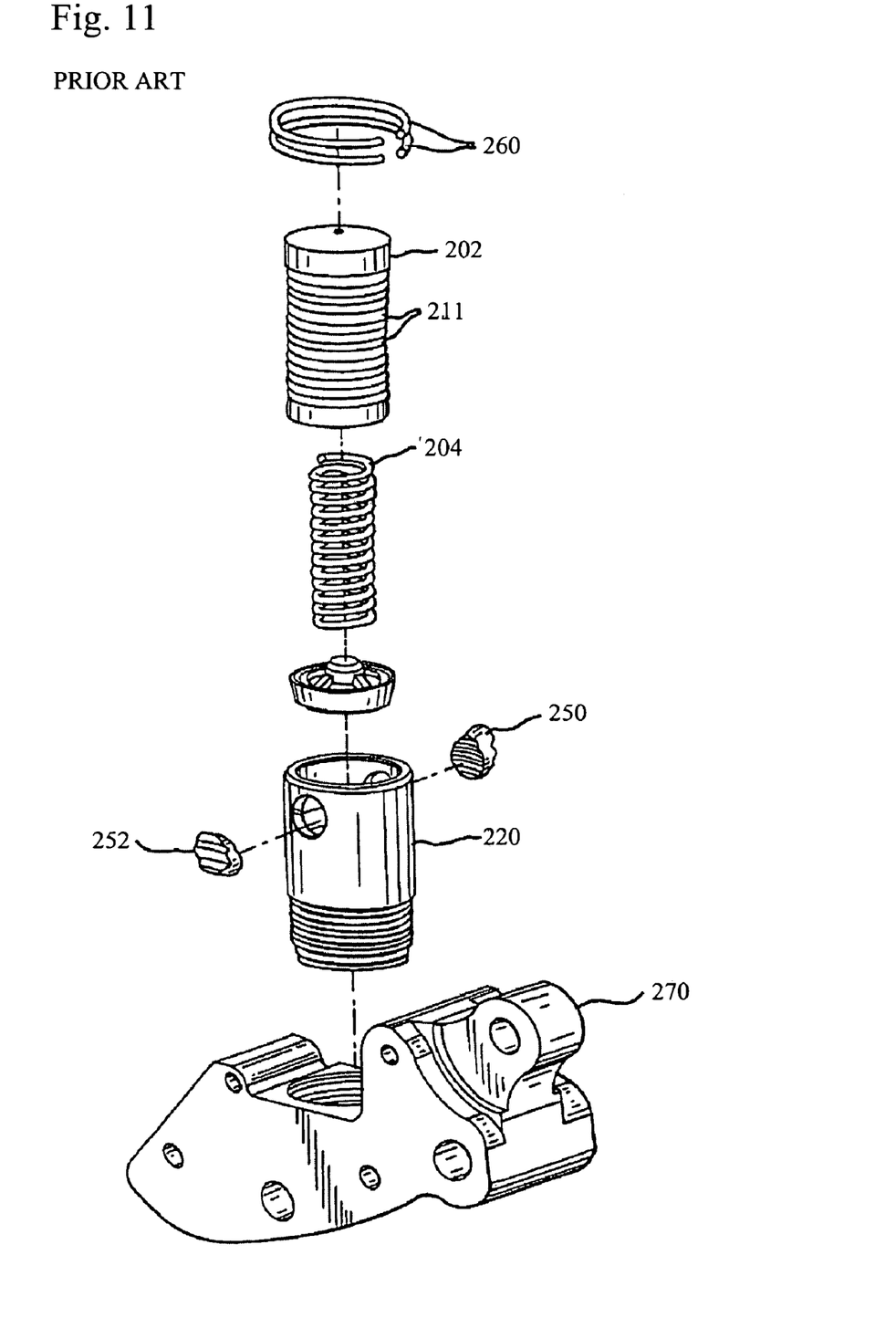
FIG. 11 shows a prior art tensioner with a ratcheting device.

Prior art FIG. 11 shows a tensioner that uses a ratchet device. The tensioner includes a housing 270 having a bore 220 that receives a pair of pawls 250, 252 held in place by circlip 260. A piston 202, with grooves 211, is slidably received within bore 220 and is biased in a protruding direction from the bore 220 by spring 204. As the piston 202 moves in a protruding direction from the bore 220, the grooves 211 of the piston engage the teeth of pawls 250, 252.

The prior art does not show an adequate means of adding a ratchet device to a blade tensioner.

SUMMARY OF THE INVENTION

A blade tensioner that imparts tension to a chain that drivingly connects a driven shaft to a driving shaft in an engine. The blade tensioner has a blade shoe with an accurately curved chain sliding face, a proximal end pivotally attached to a pivot pin of a bracket and a distal end that receives a ratchet rod. The distal end of the blade shoe slides along a first side of a sliding surface, which may be part of the bracket. The ratchet rod has a first end pivotally attached to the distal end of the shoe and a second end with a length having a plurality of teeth having a length. A spring clip receives the second end of the ratchet rod and has an edge for abutting or engaging the teeth of the ratchet rod. The spring clip biases the ratchet rod on the side opposite the length having a plurality of teeth so that the teeth of the ratchet rod engage with the edge of the spring clip. The spring clip is slidable along the second side of the sliding surface until the tab on the spring clip engages with a corresponding indentation on the second side of the sliding surface.

When the slack of the chain increases, the distal end of the blade shoe pivots away from the chain and slides on the first side of the sliding surface, forcing the ratchet rod toward the pivot pin. The toothed ramp of the ratchet rod is in contact with the edge of the spring clip and drags the spring clip on the second side of the sliding surface of the bracket along, until the spring clip tab mates with a corresponding indentation in the bracket. The slack of the chain may allow continued movement of the distal end of the blade shoe, ratcheting other teeth on the ratchet rod over the engaged edge of the spring clip.

Movement in the opposite direction is denied except for the intended backlash of the teeth of the ratchet rod as they abut the edge of the spring clip. Backlash is the allowed shuttle movement of the spring clip plus the length of one tooth of the plurality of teeth on the ratchet rod.

DETAILED DESCRIPTION OF THE INVENTION

Figure 1:
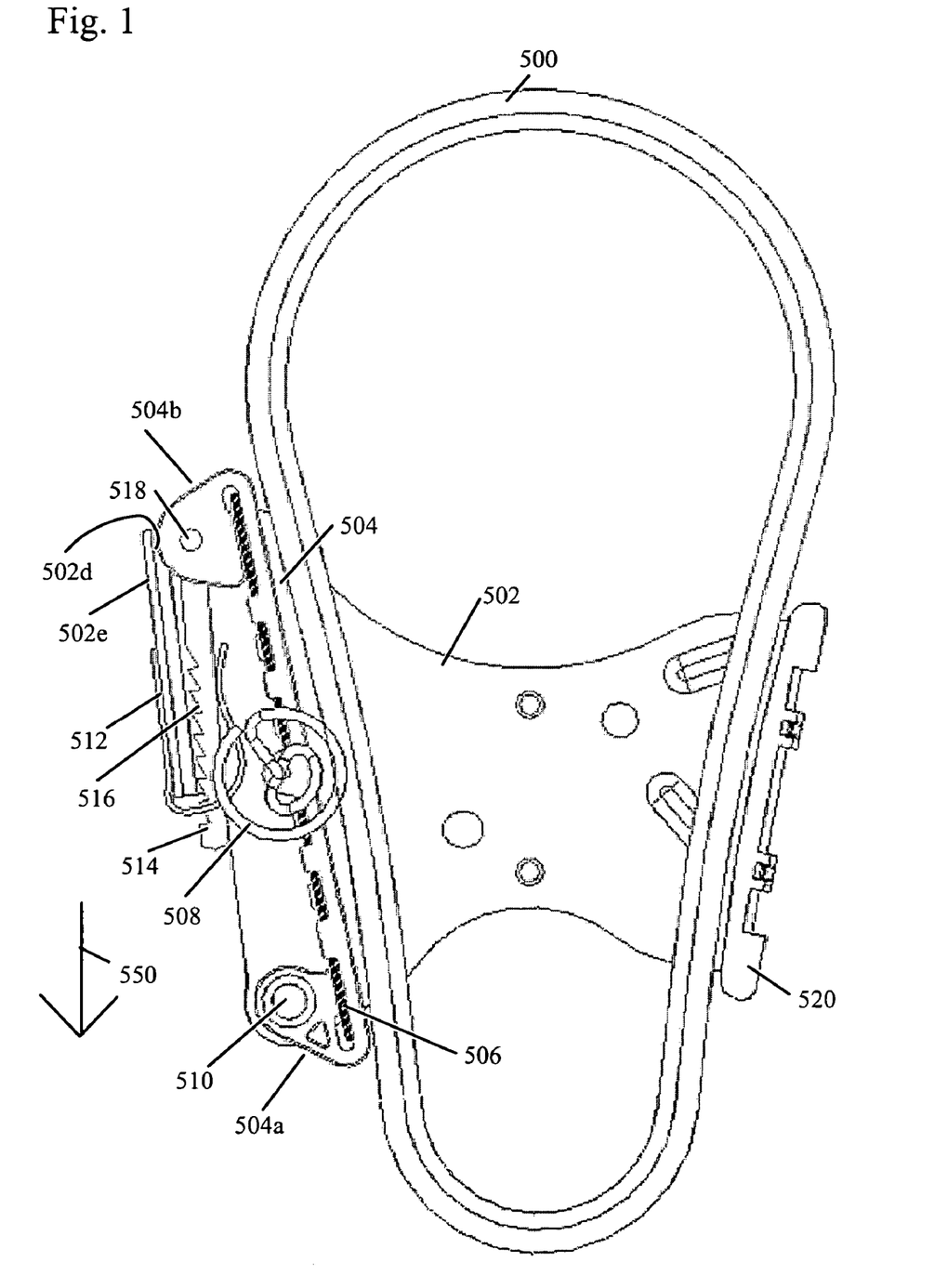
FIG. 1 shows a schematic of the tensioner of the present invention with a chain.
Figure 2A:
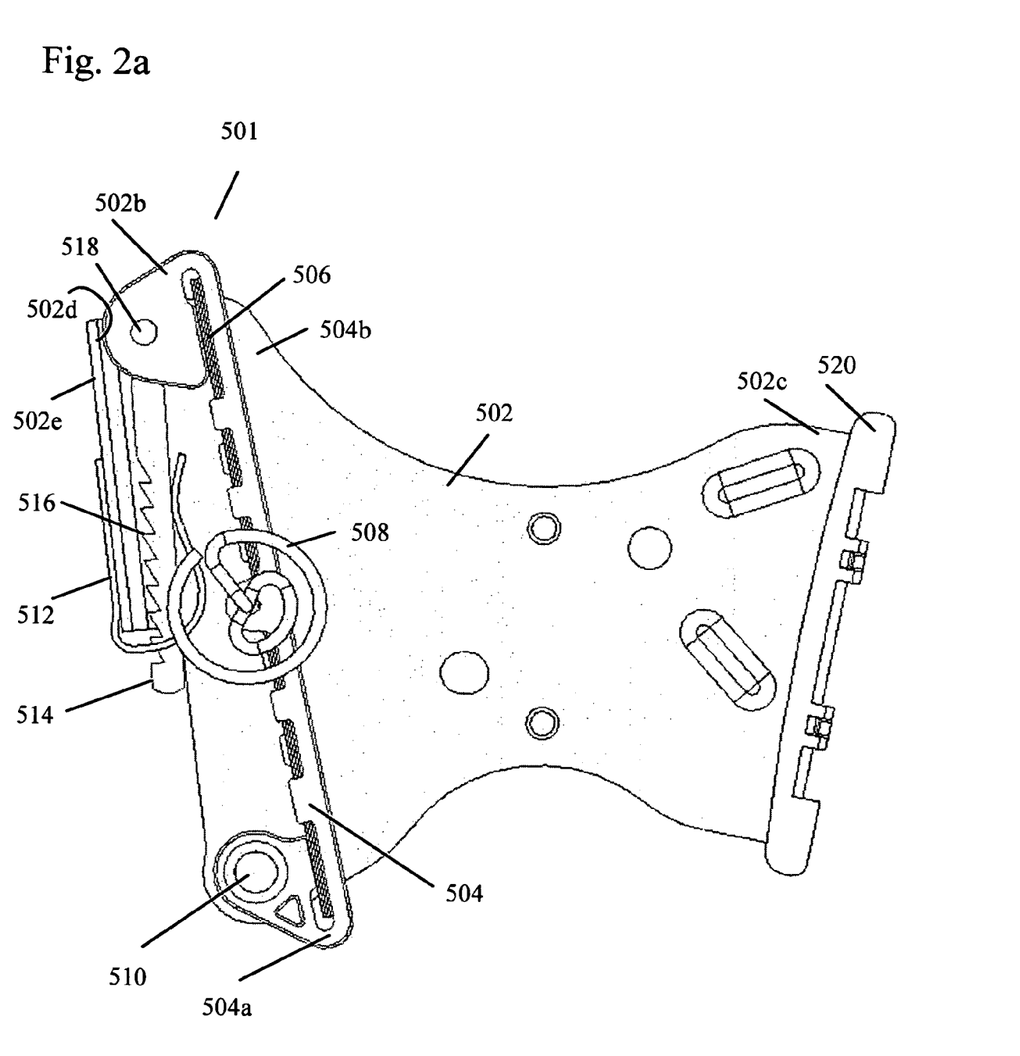
FIG. 2a shows a front view of the tensioner of the present invention without a chain.
Figure 2B:
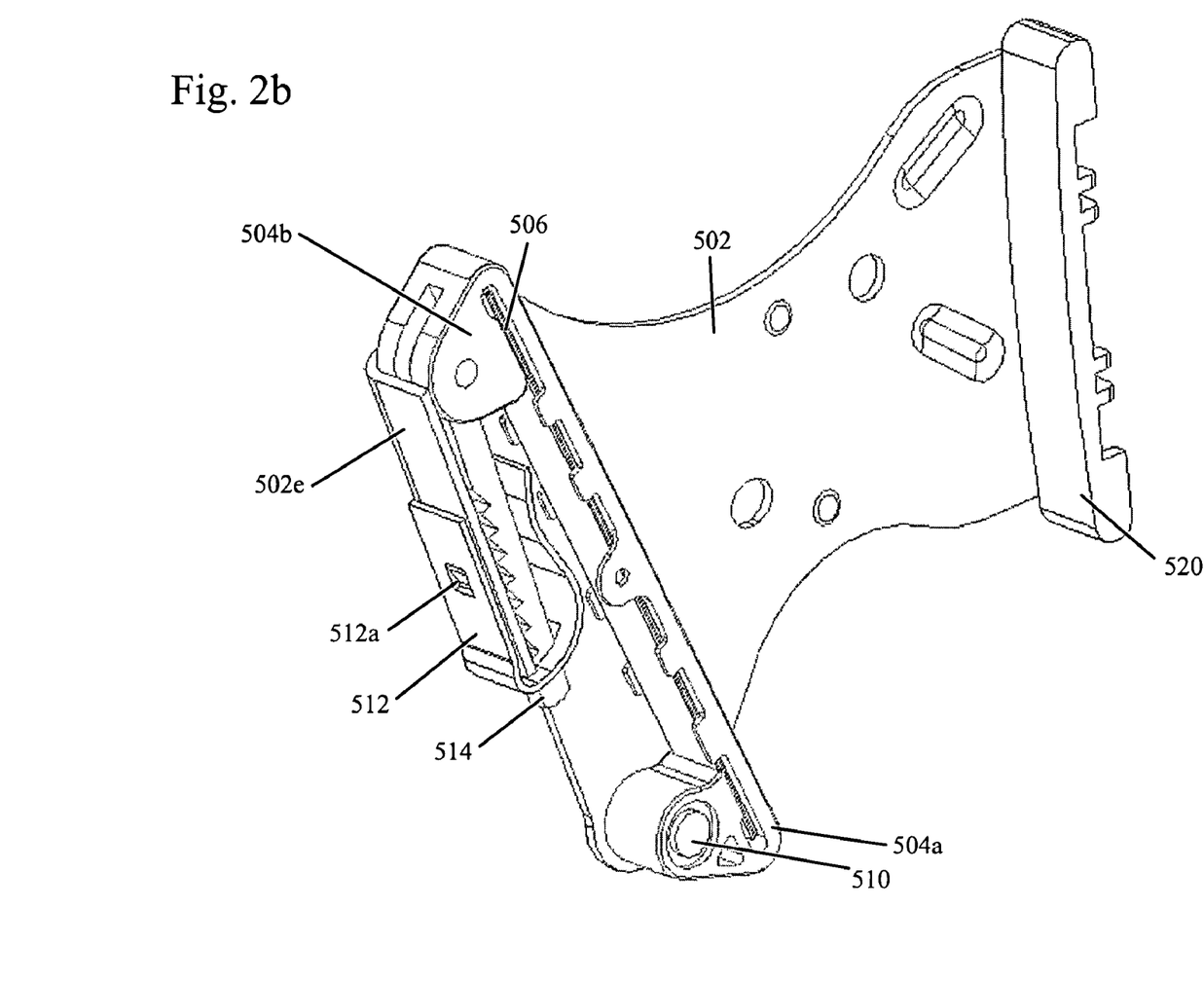
FIG. 2b shows an alternate view of the tensioner of the present invention without a chain.
Figure 3:
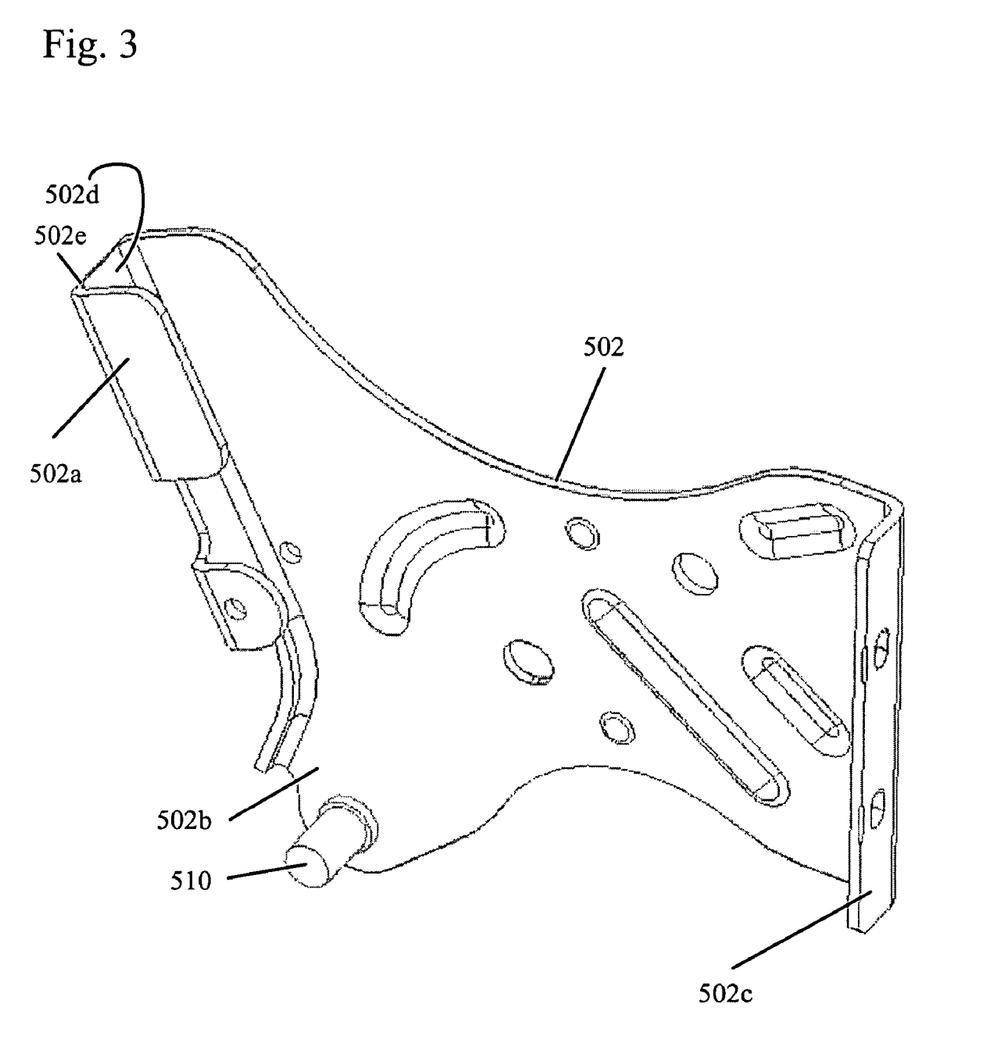
FIG. 3 shows a front view of the bracket of the tensioner.

FIG. 1 shows a schematic of the tensioner 501 with a chain 500. FIGS. 2a and 2b show the tensioner 501 and bracket 502 without the chain. FIG. 3 shows just the bracket 502.

Figure 5:
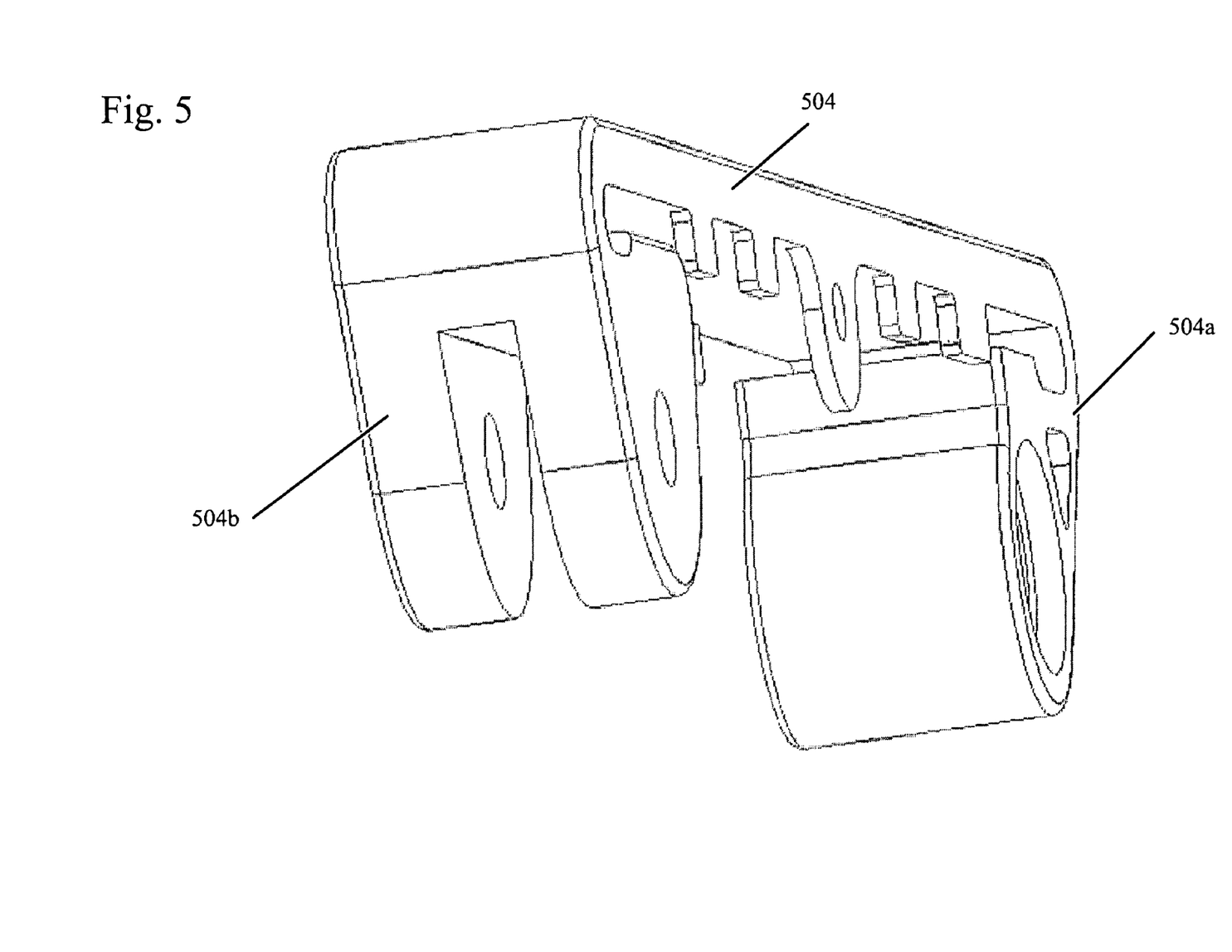
FIG. 5 shows a side view of the blade shoe of the tensioner.

The tensioner 501 and guide 520 are attached to the bracket 502. Referring to FIGS. 2a and 2b, the tensioner is comprised of a blade shoe 504 having an arcuately curved chain sliding face 504c, a distal end 504b, and a proximal end 504a. The distal end 504b of the tensioner is bifurcated as shown in FIG. 5 and receives a first end 514a of ratchet rod 514 and pin 518. The proximal end of the blade shoe pivots on pivot pin 510 of bracket 502. A blade spring 506 is placed between the blade shoe 504 and the bracket 502. The blade spring 506 runs along the length of the blade shoe (e.g. from the distal end to the proximal end). The blade spring 506 may consist of a single blade spring or multiple blade springs.

Referring to FIG. 3, the bracket 502 has a guide side 502c and an opposing tensioner side 502b. Tab 502a, spaced away from the bracket faces is integral to the tensioner side 502b of the bracket 502 is bent up away from the bracket and towards the center of the bracket 502. The distal end 504b of the blade shoe 504 fits between the tab 502a and the bracket face. Tab 502a prevents the proximal end 504a of the blade shoe 504 from disengaging pivot pin 510 of bracket 502. The distal end 504b of the blade shoe 504 slides on the inner ramp surface 502d of bent portion of the bracket 502 that forms tab 502a of the bracket 502. The outer surface 502e of the bent portion of the bracket 502 that forms tab 502a receives a spring clip 512, preferably U-shaped. Also located on the tensioner side 502b of the bracket is pivot pin 510, which the proximal end 504a of the blade shoe 504 pivots. The guide 520 is preferably stationary and fixedly attached to the guide side 502c of bracket 502 and aids in maintaining chain placement with respect to the blade shoe 504 on the opposite side of the bracket 502.

Figure 4:
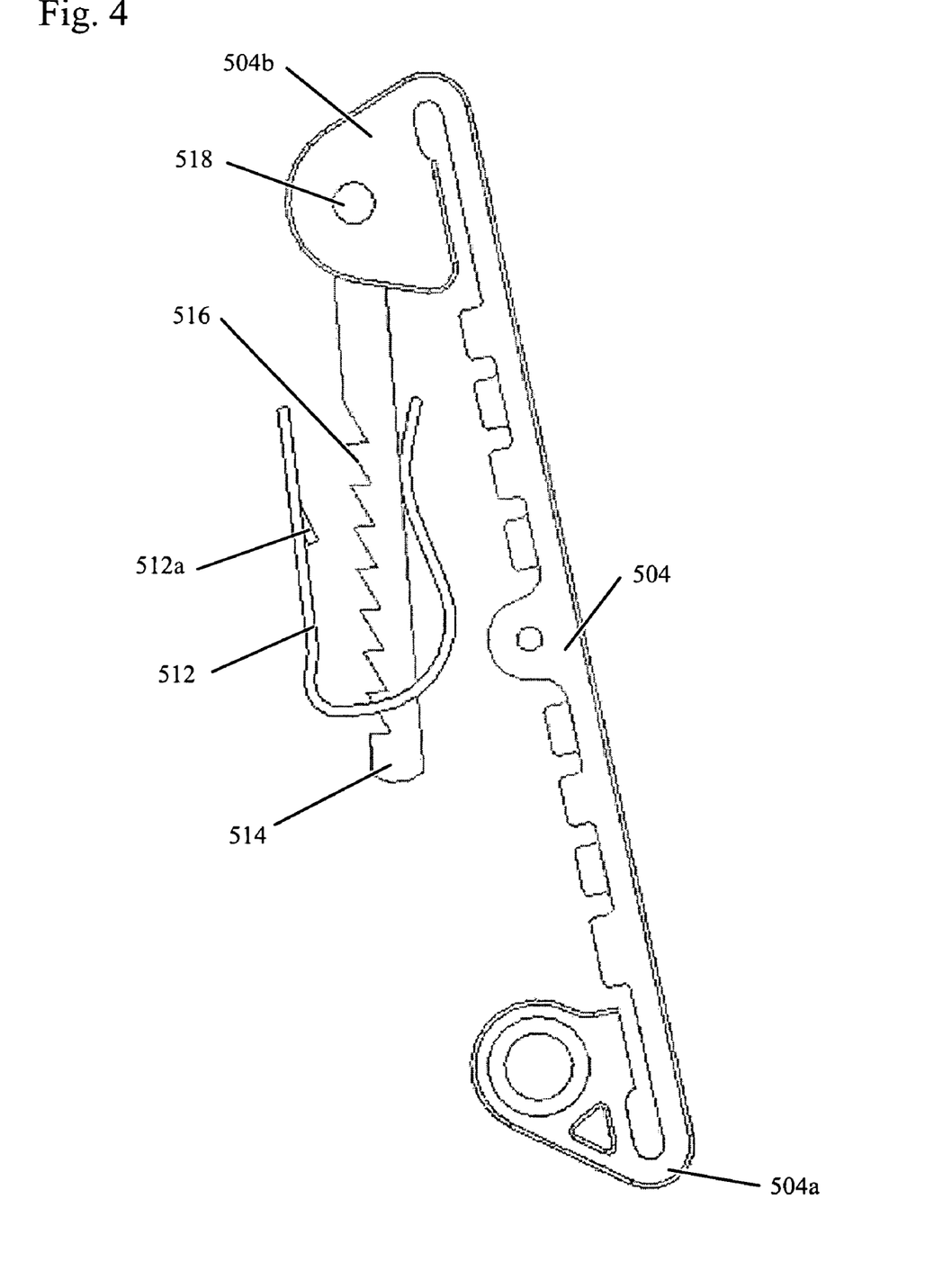
FIG. 4 shows the blade shoe of the tensioner with the ratchet device and clip.
Figure 6:
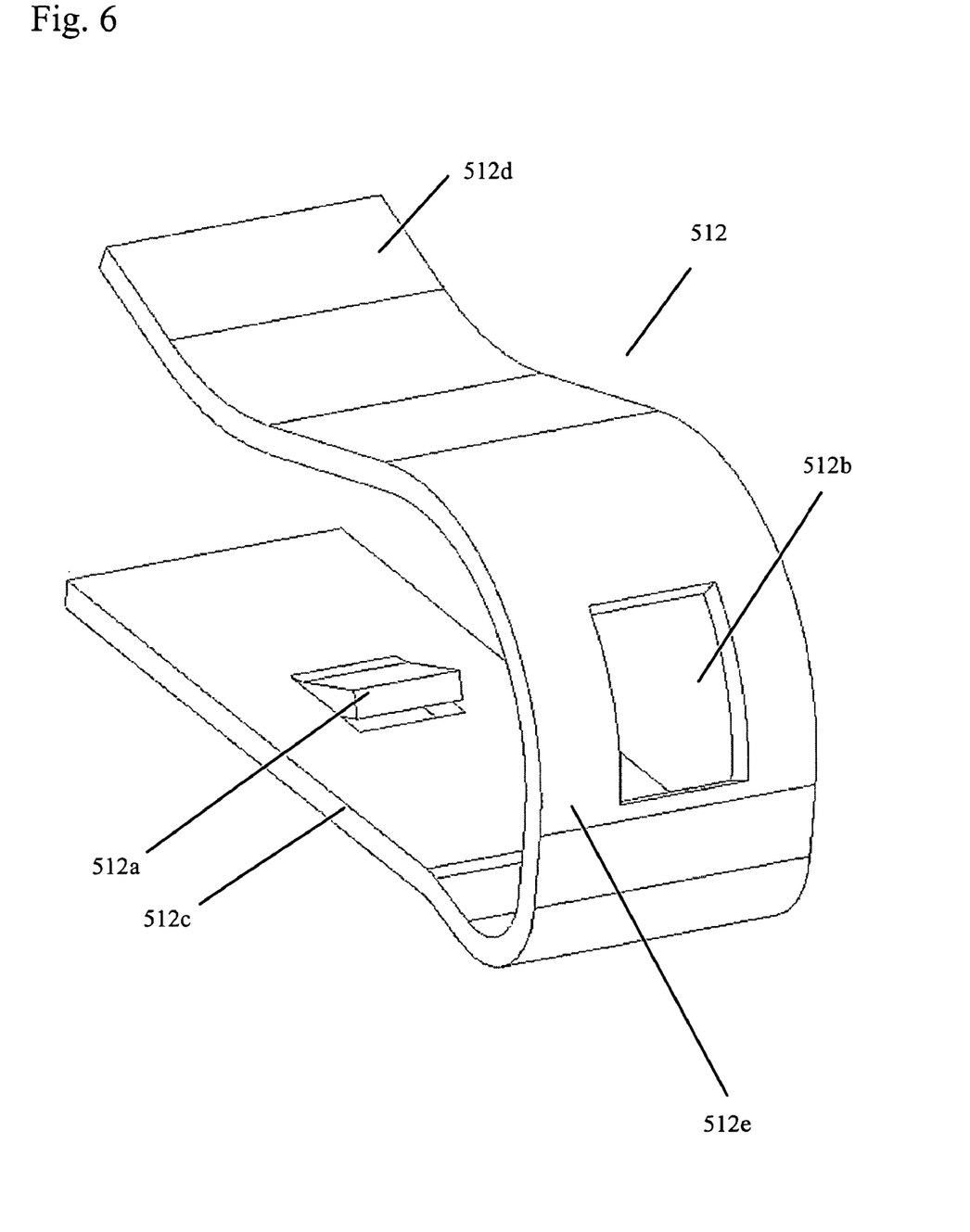
FIG. 6 shows a view of the clip.
Figure 7:
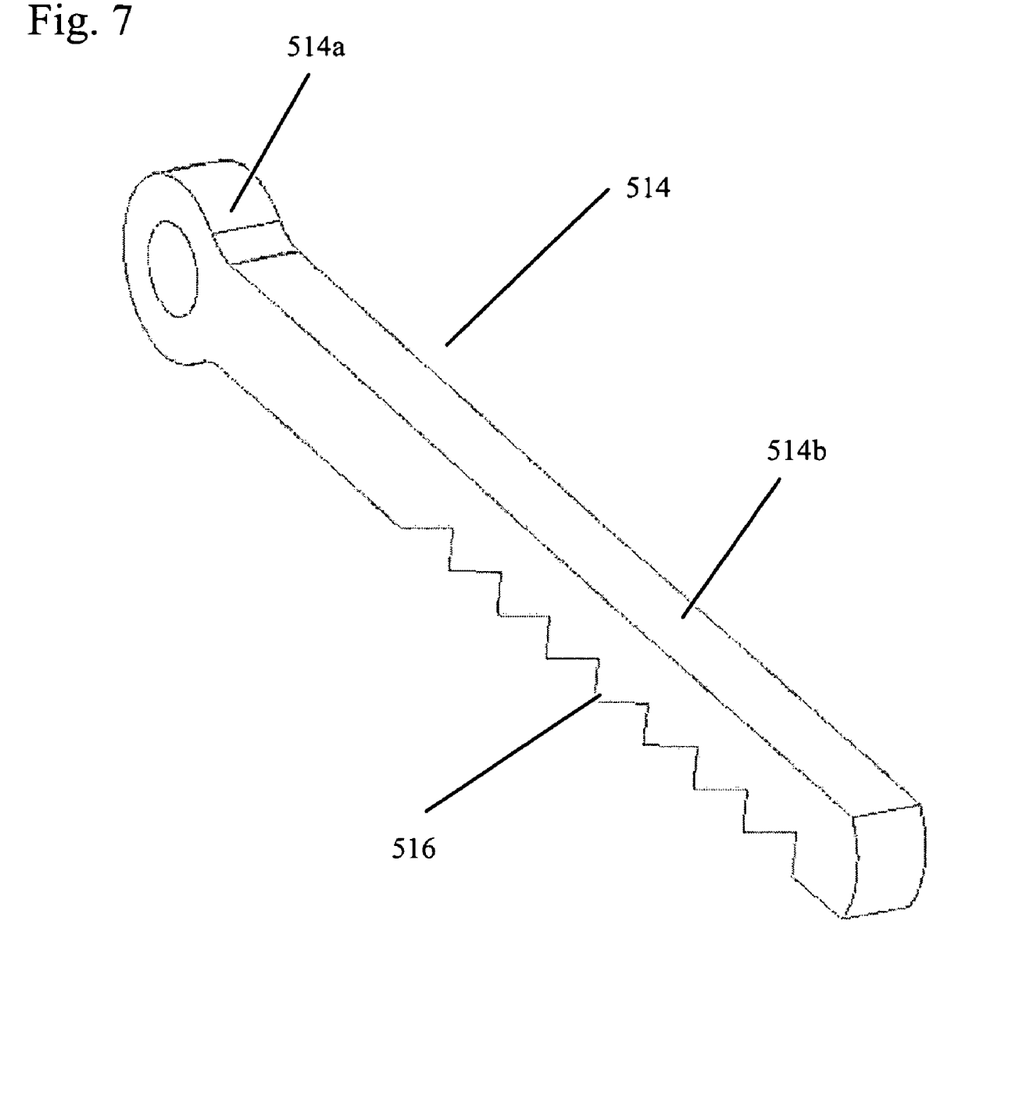
FIG. 7 shows the ratchet rod with ratchet teeth.
Figure 8:
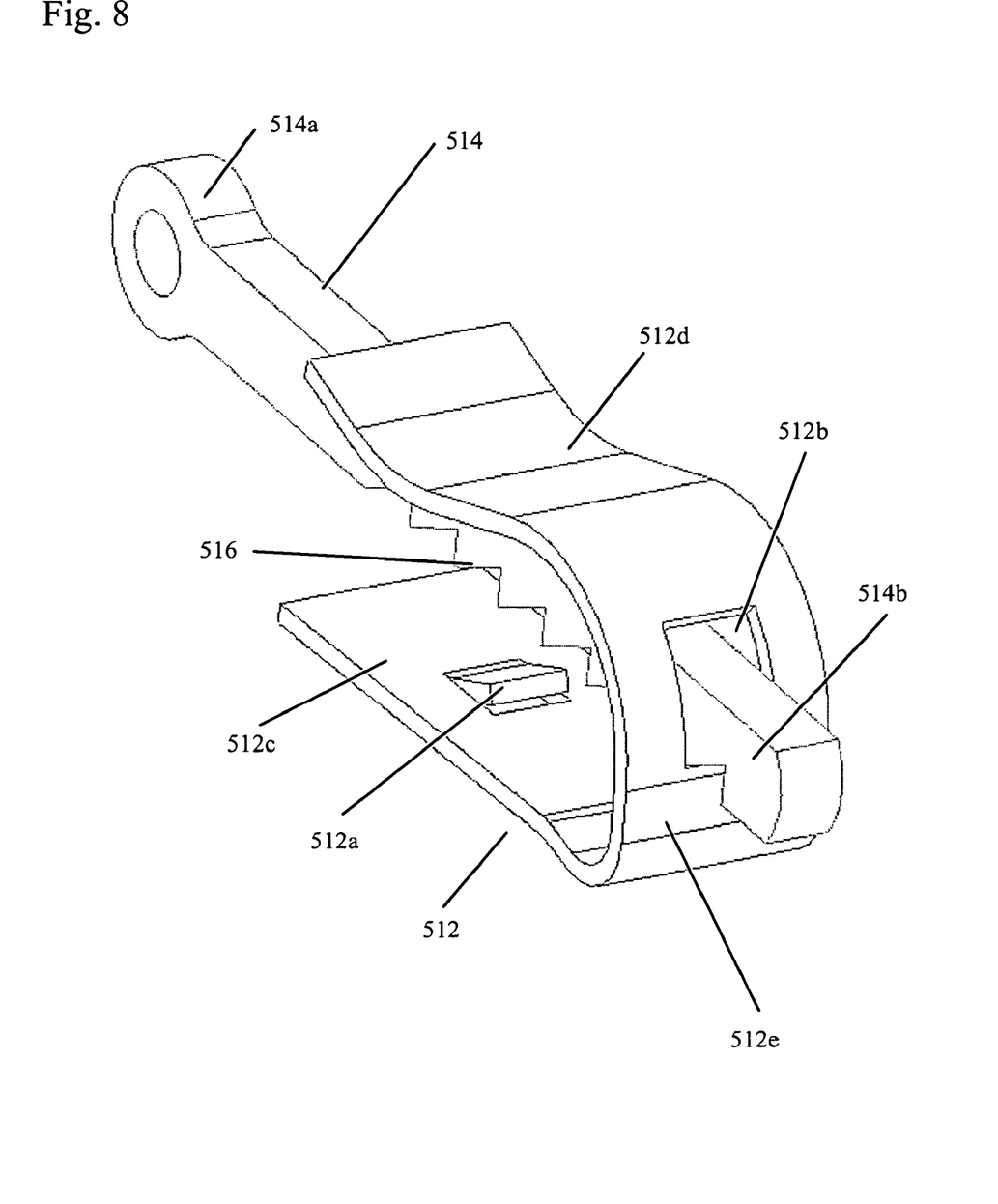
FIG. 8 shows the interaction between the U-shaped clip and the teeth of the ratchet rod.

Pivotally attached to the bifurcated distal end 504b of the blade shoe 504 by pin 518 is a ratchet rod 514 with a first end 514a for receiving pin 518 and a second end 514b with ratchet teeth 516 along its length on at least one side as shown in FIGS. 4 and 7. The U-shaped spring clip 512 slides onto and receives the outer portion 502e of the bent portion of the bracket 502 that forms tab 502a and the ratchet teethed second end 514b of the ratchet rod 514. The bottom 512e of the U-shaped spring clip 512 joins the straight side 512c of the spring clip 512 with the curved side 512d of the spring clip as shown in FIGS. 6 and 8. The curved side 512d of the U-shaped spring clip 512 applies a spring force on a portion of the ratchet rod 514 that does not have the ratchet teeth 516, forcing the ratchet teeth 516 on the other side of the ratchet rod 514 to engage or act as a ratchet with the edge of the opening 512b at the bottom 512e of the U-shaped spring clip 512.

More specifically, as the distal end portion 504b of the blade shoe 504 moves towards the pivot pin 510, the spring force applied to the ratchet rod 514 by the curved side 512d of the spring clip 512 causes the edge of opening 512b at the bottom 512e of the U-shaped spring clip 512 to be forcefully engaged with the teeth 516 of ratchet rod 514. The resulting friction plus the angle of ramp 516a of teeth 516 in contact with edge 512b of the clip moves spring clip 512 in the direction of arrow 550, to the limit allowed by the forced engagement of tab 512a with the edge of the indentation in the outer portion 502e of the bracket. The distance between the bottom 512e of spring clip 512 and the pivot pin end of inner ramp surface 502d of bracket 502 determines one element of backlash of the tensioner. Additional movement of the distal end portion of the blade shoe 504 and companion ratchet rod 514 in the direction of arrow 550 would cause sliding between ramp 516a of the ratchet rod teeth 516 and the spring clip edge 512b ratcheting from tooth to tooth 516. Tooth length is the determinate of the second element of backlash of the tensioner. Backlash is the sum of the two elements and is the functional limit of the movement allowed in the direction opposite of arrow 550.

Figure 13:
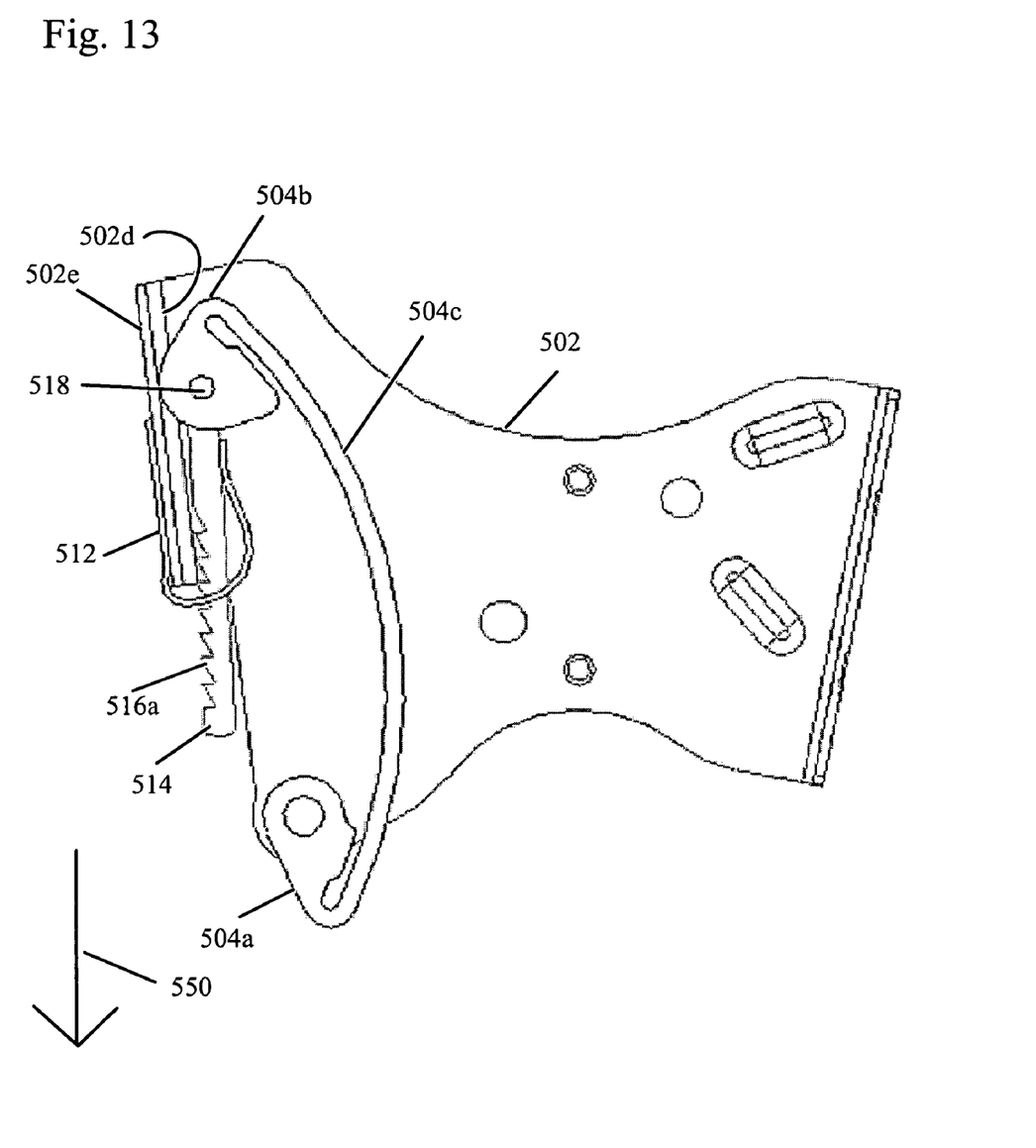
FIG. 13 shows a schematic of the tensioner of the present invention when the slack in the chain increases.

When the slack in the chain 500 increases, or the tension in the chain decreases, as shown in FIG. 13, the distal end portion 504b of the blade shoe 504 slides on inner ramp surface 502d of bent portion of the bracket 502, towards the pivot pin 510 shown by arrow 550, causing the blade shoe 504 to slightly bow out towards the chain 500 (not shown) and thus tension the chain 500. As the distal end portion 504b slides on the inner ramp surface 502d of the bracket 502, the spring clip 512 moves to the limit allowed by secured tab 502a forcefully engaged in the indentation in the outer portion 502e of bracket 502 for preventing the U-shaped clip 512 from sliding further down and off of the bracket 502. As stated above, the spring force applied to the ratchet rod 514 by the curved side 512d of the spring clip 512 causes the edge of the opening 512b at the bottom of the U-shaped clip to engage with the teeth 516 on the ratchet rod 514. The distal end portion 504b will continue to move towards the pivot pin 510, shown by arrow 550, as long as increased chain length due to chain wear continues to provide slack. The length of the ratchet rod 514, the number of teeth 516, and the location of spring clip 512 as related to arrow 550 depend on the intended wear life of the chain and how the related wear caused length growth effects the position of the distal end of the blade shoe 504b in sliding contact with ramp surface 502d of the bracket 502.

When the slack on the chain 500 decreases or the load on the chain increases, the force of the chain 500 compresses the blade shoe 504, and the distal end portion 504b of the blade shoe 504 slides on the inner ramp surface 502d of the bent portion of the bracket 502 and away form the pivot pin 510 in a direction opposite of arrow 550. As the distal end portion 504b slides on the inner ramp surface 502d of bracket 502, the spring clip 512 moves a distance up the outer surface 502e of the bent portion of bracket 502 until the bottom 512e of U-shaped clip 512 abuts with the end of surface 502e and stops. Ratchet 514, however, continues to move with the blade shoe, by tooth 516 sliding in engagement with edge of opening 512b at the bottom 512e of U-shaped clip 512 until the blunt edge of tooth 516 at the end of ramp 516a abuts the bottom 512e and is stopped. This limited motion is the backlash.

Pin 508 is present to maintain the tensioner in a fixed shipping/installation position.

While a spring clip 512 that is U-shaped is the preferred shape for the clip, other shapes performing the same functions may also be used.

The function of the bracket 502 may be achieved by protrusions on the engine block.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A blade tensioner system for a chain, the system including a blade tensioner imparting tension to the chain that drivingly connects a driven shaft to a driving shaft in an engine, the blade tensioner comprising:
   a blade shoe having an arcuately curved chain sliding face, a proximal end portion pivotally attached to a bracket and a distal end portion;
   a sliding surface on the bracket having a first side and a second side, the first side slidably receiving the distal end portion of the blade shoe;
   a ratchet rod having a first end pivotally attached to the distal end of the blade shoe and a second end with a plurality of teeth; and
   a spring clip for receiving the second end of the ratchet rod and being slidable along the second side of the sliding surface, the spring clip pressing against the ratchet rod opposite the plurality of teeth of the ratchet rod, to bias the plurality of teeth of the ratchet rod into engagement with an edge of the spring clip and a tab for engagement with a corresponding indentation on the second side of the sliding surface;
   wherein when slack of the chain increases, the distal end of the blade shoe pivots away from the chain and slides on the first side of the sliding surface, and the spring clip slides on the second side of the sliding surface a distance limited by the engagement of the tab of the spring clip with the corresponding indentation on the second side of the sliding surface, such that the spring clip presses against the ratchet rod opposite the plurality of teeth of the ratchet rod to bias the plurality of teeth of the ratchet rod into engagement with the edge of the spring clip, allowing movement of the distal end of the blade shoe towards the proximal end of the blade shoe and preventing movement in an opposite direction.

2. The tensioner of claim 1, wherein the distal end of the blade shoe is bifurcated.

3. The tensioner of claim 1, wherein the bracket further comprising a guide attached opposite the sliding surface for receiving the distal end portion of the blade shoe.

4. The tensioner of claim 1, wherein the bracket further comprises an integral tab for maintaining the blade shoe pivotally attached to the bracket.

5. The tensioner of claim 1, wherein the sliding surface for receiving the distal end portion of the blade shoe is on the bracket.

6. The tensioner of claim 1, wherein the sliding surface for receiving the distal end portion of the blade shoe is on the engine block.

7. The tensioner of claim 1, wherein maximum backlash of the tensioner is a sum of a distance between the edge of the spring clip and a bottom of the first sliding surface and the length of the teeth of the ratchet rod.

8. The tensioner of claim 1, wherein the spring clip is U-shaped and has a straight side and a curved side connected by a curved bottom defining a hole with the edge for abutting the plurality of teeth of the ratchet rod.

9. The tensioner of claim 8, wherein the straight side of the spring clip has the tab for engagement with a corresponding indentation on the second side of the sliding surface.

10. The tensioner of claim 8, wherein the curved side of the spring clip presses against the ratchet rod opposite the plurality of teeth of the ratchet rod to bias the plurality of teeth of the ratchet rod into engagement with the edge of the spring clip.

11. A blade tensioner system for a chain, the system including a blade tensioner imparting tension to the chain that drivingly connects a driven shaft to a driving shaft in an engine, the blade tensioner comprising:
   a blade shoe having an arcuately curved chain sliding face, a proximal end portion pivotally attached to a bracket and a distal end portion;
   a sliding surface on the bracket having a first side and a second side, the first side slidably receiving the distal end portion of the blade shoe;
   a ratchet rod having a first end pivotally attached to the distal end of the blade shoe and a second end with a plurality of teeth; and
   a spring clip for receiving the second end of the ratchet rod and being slidable along the second side of the sliding surface, the spring clip pressing against the ratchet rod opposite the plurality of teeth of the ratchet rod, to bias the plurality of teeth of the ratchet rod into engagement with an edge of the spring clip and a tab for engagement with a corresponding indentation on the second side of the sliding surface;
   wherein when slack of the chain increases, the distal end of the blade shoe pivots away from the chain and slides on the first side of the sliding surface, and the spring clip slides on the second side of the sliding surface a distance limited by the engagement of the tab of the spring clip with the corresponding indentation on the second side of the sliding surface, such that the spring clip presses against the ratchet rod opposite the plurality of teeth of the ratchet rod to bias the plurality of teeth of the ratchet rod into engagement with the edge of the spring clip, allowing movement of the distal end of the blade shoe towards the proximal end of the blade shoe and preventing movement in an opposite direction;
   wherein maximum backlash of the tensioner is a sum of a distance between the edge of the spring clip and a bottom of the first sliding surface and the length of the teeth of the ratchet rod.

12. The tensioner of claim 11, wherein the distal end of the blade shoe is bifurcated.

13. The tensioner of claim 11, wherein the bracket further comprising a guide attached opposite the sliding surface for receiving the distal end portion of the blade shoe.

14. The tensioner of claim 11, wherein the sliding surface for receiving the distal end portion of the blade shoe is on the bracket.

15. The tensioner of claim 11, wherein the sliding surface for receiving the distal end portion of the blade shoe is on the engine block.

16. The tensioner of claim 11, wherein the spring clip is U-shaped and has a straight side and a curved side connected by a curved bottom defining a hole with the edge for abutting the plurality of teeth of the ratchet rod.

17. The tensioner of claim 16, wherein the straight side of the spring clip has the tab for engagement with a corresponding indentation on the second side of the sliding surface.

18. The tensioner of claim 16, wherein the curves side of the spring clip presses against the ratchet rod opposite the plurality of teeth of the ratchet rod to bias the plurality of teeth of the ratchet rod into engagement with the edge of the spring clip.

* * * * *